Dec. 23, 1941.   W. L. HUME   2,266,867
SHOCK ABSORBING DEVICE
Filed Jan. 16, 1940

INVENTOR.
WILLIAM LAWSON HUME
BY
J. Edwin Coates
ATTORNEY.

Patented Dec. 23, 1941

2,266,867

UNITED STATES PATENT OFFICE 2,266,867

SHOCK ABSORBING DEVICE

William Lawson Hume, Venice, Calif., assignor to Douglas Aircraft Company, Incorporated, Santa Monica, Calif.

Application January 16, 1940, Serial No. 314,089

4 Claims. (Cl. 121—38)

My invention relates to an improvement in dashpots of the type used in hydraulic cylinders to prevent severe "bottoming" of the piston at the end of a stroke.

In prior practice it was customary to use dashpots in which strict concentric alignment was required between a cylinder and a piston. In other words, one portion of the dashpot was carried by the cylinder and the mating portion was carried by the reciprocating piston, the piston portion sliding inside or outside the cylinder portion in close relation in order that a small portion of fluid might be momentarily retained between the two portions to serve as a cushioning medium.

The old type of dashpot as described above was satisfactory from the standpoint of its stroke cushioning effect but the manufacturing problem was so great that its desirability was lessened. The difficulty lay in maintaining strict concentricity between the piston and the cylinder in order that the two dashpot portions would mate properly. This difficulty increased with the cylinder length until the rework and rejection costs became exorbitant.

On the other hand, the device of my invention has proved to have as great or greater utility than the old type dashpot and has completely eliminated the manufacturing problem with respect to the strict concentricity requirements.

It is therefore, the principal object of my invention to provide a simple and effective dashpot which permits ease of manufacture and assembly of the cylinders in which it is incorporated.

Another object is to provide a dashpot which is relatively complete in itself and is carried by only one of the members of a cylinder assembly.

Another object is to provide a hydraulic cylinder in which the dashpot cushioning fluid is carried by one of the cylinder members, being retained therein until the carrying member approaches the completion of a stroke.

Figure 1:
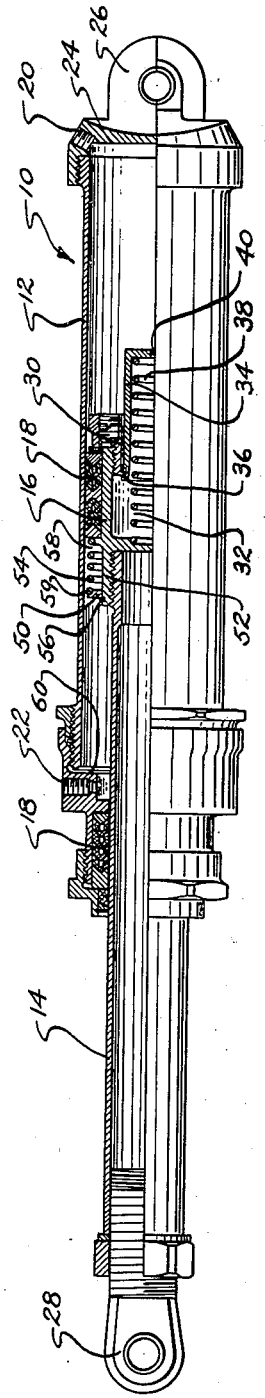
Figure 2:
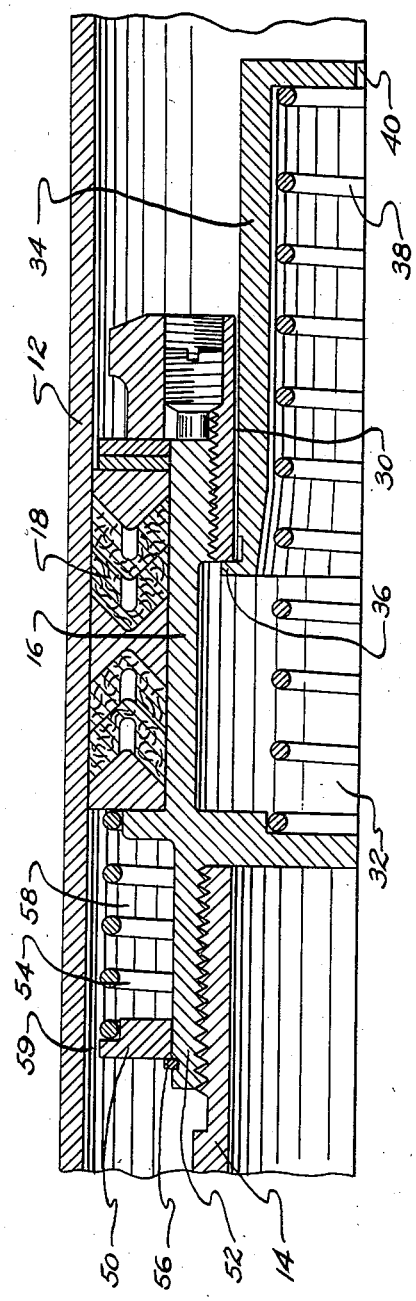

Other and further objects and advantages will become apparent as the description proceeds. My invention is shown in the accompanying drawing in which:

Figure 1 is a view partly in section of a complete hydraulic cylinder embodying the dashpots of my invention and Figure 2 is an enlarged sectional view of that portion of the cylinder in which the dashpots are carried.

In the drawing, I have shown a hydraulic cylinder assembly 10 suitable for operating any type of linkage mechanism through a two-way motion. This assembly essentially comprises a cylinder 12, a piston 14 having a piston head 16, the necessary packing 18 to prevent leakage, and a piston extension fluid port 20 and a piston retraction fluid port 22. The cylinder 12 is closed at one end by end wall 24 and is open at the other end to permit the piston 14 to pass therethrough, the opening being sealed around the piston by one of the packing glands 18 to prevent leakage. The cylinder assembly may be attached for operation by means of a fitting 26 at the closed end of the cylinder 12 and by a fitting 28 at the exterior end of the piston 14.

The cylinder assembly as thus far described is more or less conventional both in construction and in operation. In order to extend the piston, fluid under pressure enters the cylinder 12 through port 20 at the closed end of the cylinder and forces the piston outward. Conversely, to retract, fluid enters the port 22 at the open end of the cylinder and moves the piston inward. It may be seen then, that as fluid under pressure enters port 22 for example and all pressure has been relieved at port 20 the piston will move rapidly inward, forcing the fluid in the interior end of the cylinder to exit through port 20 in an equally rapid manner. This rapid inward motion of the piston continues until the piston head strikes the cylinder end wall 24 or some other stop in the structure provided for the purpose. It is this sharp impact at each end of the stroke that engineers have tried in various ways to eliminate through the use of a dashpot because the impact is harmful both to the packings and to the cylinders and piston structure.

The dashpots of my invention effectively prevent the sharp impact, decelerating the piston in both directions of travel as it approaches the end of the stroke. To obtain the dashpot effect at the end of the inward travel I have built the dashpot into the inner end of the piston head 16. This has been accomplished by providing a bore 30 which extends interiorly of the head and opens upon a chamber 32. In this bore, with a slightly loose fit, there is provided a cup-shaped dashpot member 34 which is adapted to reciprocate. The open end of the cup 34 faces the chamber 32, the construction being such that the cup volume augments the chamber volume for the purpose of holding hydraulic fluid. The cup has an outwardly turned annular flange 36 about its open end which is larger than the bore 30 and thus the cup is prevented from leaving the bore and its connection with the fluid chamber 32. A compression spring 38 of a diameter slightly smaller than the inside diameter of the cup fits inside the cup and the chamber and thus urges the cup away from the chamber to the extent allowed by the cup flange 36. A small hole 40 in the closed end of the cup permits the entrance of fluid to the chamber 32 via the interior of the cup, and fluid enters this chamber as the piston 14 is moved outward by the entrance of fluid at cylinder port 20.

The operation of the dashpot 34 is as follows: Assuming the piston to be at the outward end of its stroke and pressure relieved at port 20, pressure is then applied at port 22 to move the piston inward. The piston moves rapidly inward as previously described until the cup 34 which is being held extended by the spring 38, contacts the cylinder end wall 24. As the cup contacts the end wall, the fluid hole 40 in the closed end of the cup is covered by the end wall and the fluid inside the chamber 32 and the cup is momentarily confined therein. However, as pressure is still being applied to move the piston inward, the cup 34 begins to compress and move into the chamber against the lesser pressure of the spring 38. This inward movement of the cup with respect to the piston head, of course, reduces the volume of the chamber 32 and the fluid therein is thus placed under pressure and is forced out between the outer wall of the cup and the bore 30 by reason of the slightly loose fit previously mentioned. This only exit for the fluid from the chamber is thus necessarily of a restrictive nature and accordingly the exit of the fluid is greatly retarded thereby. Therefore the rapid movement of the piston is first cushioned by the compression of the cup 34 into the chamber 32. Then the piston is slowly permitted to move onward to the end of its stroke as the fluid is forced through the restricted exit. When the piston 14 is again moved outward, the dashpot cup 34 is extended by the spring 38 and fluid again enters the chamber 32 through the hole 40, whereupon the dashpot is once more ready to cushion and retard the last portion of the next inward stroke of the piston 14.

To cushion and retard the outward stroke of the piston 14, I have provided a dashpot embodying the same principles as the one just described. In this embodiment I employ an annular dashpot ring 50 which encircles the left end 52 of the piston head 16 with a slightly loose fit as in the dashpot 34. The ring is adapted to move to and from the piston head, riding on the left end portion 52 and is urged away from the head by a compression spring 54 encircling end portion 52 and lying between the head 16 and ring 50. Movement of the ring 50 is halted by a snap ring 56 imbedded in and encircling the piston head and portion 52 a short distance from the head. An annular fluid chamber 58 is thus formed between the piston head 16 and the ring 50 as the latter is held against the snap ring 56 by the pressure of the spring 54. In order that the chamber 58 may be filled by fluid, clearance is left at 59 between the outer surface of the ring 50 and the inner surface of the cylinder wall 12 and fluid enters the chamber as the piston 14 is moved inward by fluid under pressure from cylinder port 22.

The operation of the dashpot 50 is as follows: Assuming the piston to be at the inward end of its stroke and pressure relieved at port 22, pressure is then applied at port 20 to move the piston outward. The piston moves rapidly outward until the left face of the ring 50 comes in contact with an annular member 60 extending inwardly of the cylinder wall at a location adjacent the fluid port 22. As the ring contacts the member 60, the clearance 59 between the outer surface of the ring 50 and the inner surface of the cylinder wall 12 is closed by said member and the fluid inside the chamber 58 is momentarily confined therein. However, as pressure is still being applied to move the piston outward, the ring and piston head begin to move toward each other against the lesser pressure of the spring 54. This movement, of course, reduces the volume of the chamber 58 and the fluid therein is thus placed under pressure and is forced out between the inner surface of the ring 50 and the left end 52 of the piston head by reason of the slightly loose fit previously mentioned. This only exit for the fluid from the chamber is thus necessarily of a restrictive nature and accordingly the exit of the fluid is greatly retarded thereby.

Thus, as in the operation of the embodiment first described, the rapid movement of the piston is first cushioned by the compression of the spring 54 and the fluid in the chamber 58 when the ring 50 contacts the member 60. Then the piston is slowly permitted to move onward to the end of its stroke as the fluid is forced through the restricted exit. When the piston 14 is again moved inward, the ring is moved to the left by the spring 54 and fluid again enters the chamber 58 through the clearance 59 between the ring and the cylinder wall, whereupon the dashpot is once more ready to cushion and retard the last portion of the next outward stroke of the piston 14.

In using my invention in cylinders of various designs and proportions, it may be desirable to modify the structure. For example, it is possible to construct the cylinder so that one or both of the dashpots are carried thereby rather than by the piston as illustrated in the drawing. Furthermore, it may be desirable to vary the manner of releasing the trapped fluid in the dashpot chambers. Several small holes might be drilled through the side walls of the cup 34, the diameters of these holes decreasing as the bottom of the cup is approached. Likewise small holes might be drilled from one side face to another of the ring 50. Under certain conditions, the use of such holes permits a more regulated and steady deceleration of the piston as it approaches the end of its stroke.

It is intended in the claims to cover such modifications and changes and others which might be made by those skilled in the art without departing from the essence of the invention.

I claim:

1. In a telescopic mechanism having a cylinder, a piston slidable longitudinally within said cylinder, and a head on said piston, shock absorbing means carried by said piston and adapted to cushion the last portion of the stroke of said piston, said shock absorbing means comprising a ring member slidable on said piston adjacent said piston head, resilient means urging said ring away from said head in a manner such that a fluid chamber is formed between said ring and said head, the volume of said chamber being variable as said ring slides with respect to said piston to and from said head, fluid in said chamber, means forming a restricted exit for said fluid from said chamber, said fluid being forced therethrough by movement of said ring toward said head, inwardly extending means forming a part of said cylinder for contacting said ring as said piston enters the last portion of its stroke and for holding said ring stationary as said piston completes its stroke, thereby reducing the volume of said fluid chamber as said head moves toward said ring and forces the fluid from said chamber.

2. In a telescopic mechanism having a cylinder, a piston slidable longitudinally within said cylinder, and a head on said piston, shock absorbing means carried by said piston and adapted to cushion the last portion of the stroke of said piston, said shock absorbing means comprising a ring member slidable on said piston adjacent said piston head and having an outside diameter smaller than the inside diameter of said cylinder so that a clearance is left therebetween, resilient means urging said ring away from said head in a manner such that a fluid chamber is formed between said ring and said head, the volume of said chamber being variable as said ring slides with respect to said piston to and from said head, fluid in said chamber, means forming a restricted exit for said fluid from said chamber, said fluid being forced therethrough by movement of said ring toward said head, inwardly extending means forming a part of said cylinder, said means serving to reduce the inside diameter of said cylinder to a value smaller than the outside diameter of said ring whereby said ring contacts said inwardly extending means as said piston enters the last portion of its stroke and is held stationary by reason of said contact as said piston completes its stroke, thereby reducing the volume of said fluid chamber as said head moves toward said ring and forces the fluid from said chamber through the restricted exit means, the clearance between said ring and said cylinder being closed by the contact of said ring with said inwardly extending means.

3. In a telescoping mechanism having a cylinder, a piston slidable longitudinally within said cylinder, and a head on said piston, shock absorbing means carried by said piston and adapted to cushion the last portion of the stroke of said piston, said shock absorbing means comprising a ring member movable with said piston in all but the latter portion of the stroke, resilient means holding said ring a fixed distance from said piston head, and means engageable with said ring at a point near the end of said piston's travel to overcome said resilient means and hold said ring against further movement with said piston.

4. In a telescoping mechanism having a cylinder, a piston slidable longitudinally within said cylinder, and a head on said piston, shock absorbing means carried by said piston and adapted to cushion the last portion of the stroke thereof, said shock absorbing means comprising a ring member movable with said piston in all but the latter portion of the stroke, resilient means holding said ring a fixed distance from said piston head to form a chamber therebetween, fluid in said chamber, and means engageable with said ring at a point near the end of said piston's travel to hold said ring against further movement with said piston, whereby said chamber formed between said piston head and said ring member is reduced in volume.

WILLIAM LAWSON HUME.